United States Patent [19]

Meki et al.

[11] 3,836,708

[45] Sept. 17, 1974

[54] COLOR TELEVISION SATURATION CONTROL

[75] Inventors: Nori Meki, Takatsuki; Hiroyuki Irie, Osaka, both of Japan

[73] Assignee: Matsushita Electric Industrial Co., Ltd., Osaka, Japan

[22] Filed: June 28, 1973

[21] Appl. No.: 374,666

[30] Foreign Application Priority Data

June 30, 1972 Japan ............................... 47-66143
June 30, 1972 Japan ............................... 47-66144

[52] U.S. Cl. ............................................ 178/5.4 AC
[51] Int. Cl. ............................................ H04n 9/48
[58] Field of Search...... 178/5.4 AC, 5.4 HE, 5.2 A, 178/5.4 R, 5.4 CK, 5.4 MC, 5.4 CD; 330/96, 25, 28

[56] References Cited

UNITED STATES PATENTS 3,708,613 1/1973 Nakabe et al........................ 178/5.4

*Primary Examiner*—Richard Murray
*Assistant Examiner*—R. John Godfrey
*Attorney, Agent, or Firm*—Stevens, Davis, Miller & Mosher

[57] ABSTRACT

A color television receiver having a system for controlling the color saturation in which either of a divided dc voltage signal of a dc source or a mean-rectified dc signal of the output of a band pass amplifier in the color signal circuit can be selectively derived through a change-over switch and applied to said band pass amplifier through a common variable resistance to control the gain of said band pass amplifier and thereby control the color saturation.

4 Claims, 6 Drawing Figures

COLOR TELEVISION SATURATION CONTROL

This invention relates to a color television receiver capable of easily controlling the color saturation.

In color television receivers, an automatic color control circuit is provided to hold the level of the chroma signal constant by means of a burst signal. However, with such an arrangement of the automatic color control circuit, it is impossible to compensate for the differential gain in the transmission system and receivers, and the difference in the color saturation caused by adjustment errors, etc., in the television camera. In order to eliminate such drawbacks, it has been proposed to employ another automatic color control circuit using a chroma signal in addition to the conventional automatic control circuit using a burst signal. This invention relates to the automatic control circuit using a chroma signal. In the description, hereinafter, the term "automatic color control circuit" means only the automatic color control circuit using a chroma signal.

An object of this invention is to provide a color television receiver comprising means for finely varying the color saturation in the mode of automatic color control to suite personal taste, said means being common with the means for varying the color saturation only manually, thereby the adjusting operation being simplified.

Another object of this invention is to provide a color television receiver comprising means for finely varying the color saturation in the automatic color control mode and for varying the color saturation in the manual mode, and resistors selectively connected to said means and interlocking with the mode selection.

According to an embodiment of this invention, there is provided a color television receiver comprising a band pass amplifier for the chrominance signal, the gain of which is controlled by a dc control signal applied to a control terminal, a circuit for meanrectifying the chrominance signal supplied from said band pass amplifier, a change-over switch for selecting one of the output of said rectifying circuit and a dc signal derived from a dc source, a variable voltagedividing circuit for dividing the voltage signal derived through said change-over switch, including a variable resistor, and a circuit for applying the voltage signal divided in said variable voltage-dividing circuit to the control terminal of said band pass amplifier as the dc control signal.

According to the above embodiment, since the variable resistance which adjusts the color saturation by dividing a dc source voltage in the manual mode is also used for finely adjusting the color saturation in the automatic mode to suite personal taste, the operation and structure of the color control is simplified.

According to another embodiment of this invention, there is provided a color television receiver comprising a band pass amplifier for the chrominance signal the gain of which is controlled by a dc control signal applied to a control terminal, a circuit for mean-rectifying the chrominance signal supplied from said band pass amplifier, a change-over switch for selecting one of the output of said rectifying circuit and a dc signal derived from a dc source, a first variable resistance for dividing the voltage derived through said change-over switch, controlling the color saturation, and a second variable resistance having one fixed terminal connected to a terminal supplied with the divided voltage from said first variable resistance, another fixed terminal connected to the dc source and selectively to the ground through a diode for compensating the non-linearity of the gain control characteristic of said band pass amplifier and a sliding terminal connected to said control terminal of said band pass amplifier for supplying a dc control signal to control the gain of the band pass amplifier, interlocking with a variable resistance which controls one of the contrast and the brightness or both the contrast and the brightness.

According to the above embodiment, the two variable resistors can be used as the color volume and the sub-color volume both in the automatic and the manual color control mode. Further, the use of one diode perfectly removes tracking and the reduction of the variable range in the automatic color control mode.

Further objects, features and advantages of the present invention will become apparent from the following detailed description taken in conjunction with the accompanying drawings, in which.

Figure 1:
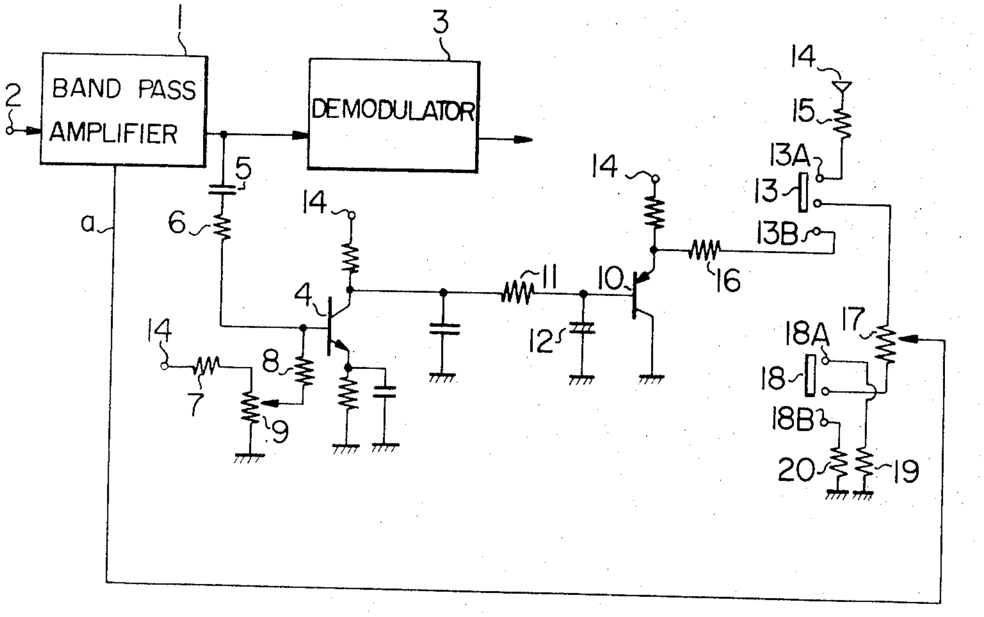
FIG. 1 is a block diagram of a partial structure of a color television receiver according to an embodiment of this invention.

FIG. 1 shows a part of a color television receiver. The video signal is applied to a band pass amplifier 1 through a terminal 2 and amplified therein. The gain of the band pass amplifier 1 is controlled by a dc voltage applied to a control terminal through a line *a*; for example, the base bias of an amplifying transistor in the band pass amplifier 1 is controlled by the dc voltage on the line *a*. The amplified chrominance signal supplied from the band pass amplifier 1 is demodulated in a demodulator 3 which supplies the output to the output stages of the respective colors. A transistor 4 is connected to the band pass amplifier 1 through a capacitor 5 and a resistor 6 to amplify the output of the band pass amplifier 1. The base of this transistor 4 is applied with a bias voltage determined by resistors 7 and 8 and a variable resistor 9. The collector of the transistor 4 is connected to the base of another transistor 10 through a resistor 11. A capacitor 12 transforms the output of the transistor 4 into a dc signal. The output of the transistor 10 is connected to one change-over contact 13B of a change-over switch 13 through a resistor 16. The other change-over contact 13A is connected to the dc source terminal 14 through a resistor 15. The common contact of the change-over switch 13 is connected to one fixed terminal of a variable resistor 17 which has the other fixed terminal connected to the common contact of a change-over switch 18 and a sliding contact connected to line *a*. The change-over switch 18 has change-over contacts 18A and 18B connected to the ground through resistor 19 and 20 and is interlocked with said change-over switch 13.

Figure 2:
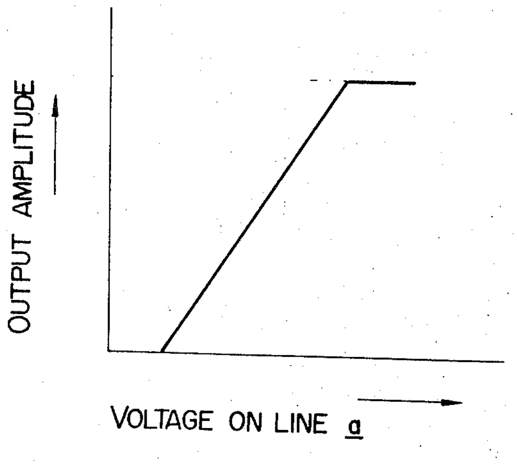
FIGS. 2 and 3 show the curves of the output amplitude of the chrominance signal with respect to the gain controlling coltage and the rotation angle of the variable resistor in the embodiment of FIG. 1.

Operation of the above circuit will be described hereinbelow. When the change-over switches 13 and 18 are thrown in A side (manual mode), the circuit for compensating the color saturation formed mainly of the transistors 4 and 10 is isolated from the line *a* and the voltage applied to the source terminal 14 is divided by the resistors 15, 17 and 19. A dc voltage derived from the sliding terminal of the variable resistor 17 is applied to the line *a* and controls the amplitude of the chrominance signal supplied to the demodulator 3. The output amplitude of the band pass amplifier 1 (amplitude of the chrominance signal) with respect to the voltage on the line *a* is shown by the curve in FIG. 2. The line *a* voltage is varied by the rotation of the variable resistor 17. The output amplitude of the band pass amplifier 1 with respect to the rotation of the variable resistor can be changed from zero to X and is shown by curve C in FIG. 3.

When the change-over switches 13 and 18 are thrown into B side (automatic mode), the color saturation compensating circuit is in function.

A part of the output chrominance signal of the band pass amplifier 1 is applied to the base of the transistor 4 through the capacitor 5 and the resistor 6 to be amplified in the transistor 4. In this process, for giving a center of control for the color saturation, a predetermined bias is set by the resistors 7 and 8 and the variable resistor 9 and applied to the base of the transistor 4. The signal amplified by the transistor 4 is transformed into a dc voltage through the base-emitter of the transistor 4, the resistor 11 and the capacitor 12 and applied to the base of the transistor 10. The output dc signal of the transistor 10 is divided by the resistors 16, 17 and 20 and the input impedance of the color control terminal of the band pass amplifier 1 connected with the line *a* seen from the variable resistor 17. The divided voltage on the sliding terminal of the variable resistor 17 is supplied to the color control terminal of the band pass amplifier 1 as the color controlling voltage.

If a signal of high color saturation appears on the output terminal of the band pass amplifier 1, it is applied to the base of the transistor 4 through the capacitor 5 and the resistor 6 and lowers the collector voltage. Thereby, the output voltage of the transistor 10 and the voltage on the line *a* are also lowered to reduce the color saturation. Thus, automatic color control is performed.

Figure 3:
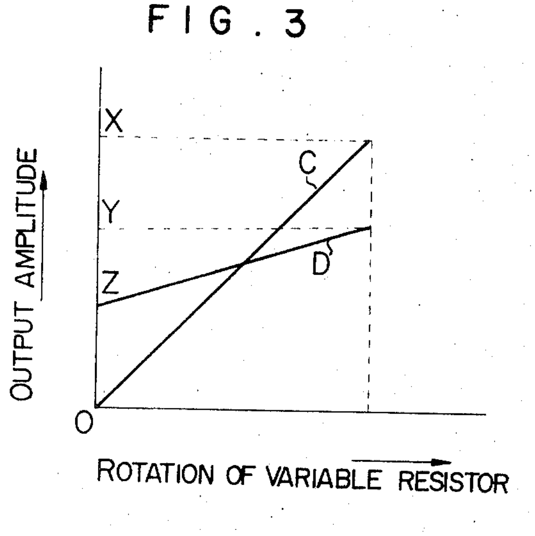

When the loop gain of the band pass amplifier 1 and the transistors 4 and 10 forming the color saturation compensating circuit is sufficiently high, the voltage on the line *a* does not change by the position of the sliding terminal of the variable resistor 17. However, since said loop gain is finite, the output amplitude of the band pass amplifier 1 changes in a relatively narrow range of Y to Z with respect to the rotation of the variable resistor 17 as is shown by curve D in FIG. 3. In FIG. 3, the values of X and 0 are determined by the resistors 15 and 19 and the variable resistor 17, and the values of Y and Z by the resistor 16 and 20 and the variable resistance 17.

Thus, on an appropriate selection of the resistors 15, 16, 19, and 20 and the variable resistor 17, a same variable resistance 17 can be used to vary the output amplitude in the range from O to X when the change-over switches 13 and 18 are on A side and in the smaller range from Y to Z according to the personal taste when the change-over switches 13 and 18 are on B side.

As has been described above, according to this embodiment, a divided dc voltage from a dc voltage source and the mean-rectified dc signal of the output of the band pass amplifier are changed over according to manual and automatic mode. And yet, the derived dc signal is applied to a common variable resistor and the resultant divided voltage is applied to the color control terminal of the band pass amplifier to perform the color control. Thus, the fine color control is also possible in the automatic color control mode to suite personal taste through the same variable resistor. Thereby, the color control operation is simple.

Figure 4:
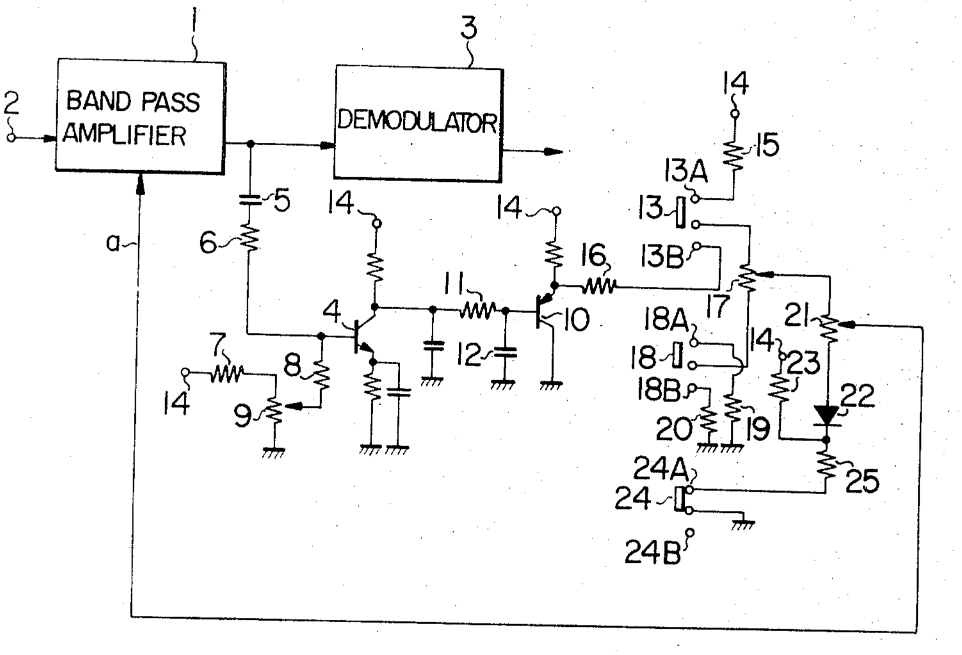
FIG. 4 is a block diagram of a partial structure of a color television receiver according to another embodiment of this invention.

Another embodiment is shown in FIG. 4, in which two variable resistors are used as the main and subcolor volume. In FIG. 4, marks similar to those in FIG. 1 (1 to 20 and *a*) denote similar parts as those in FIG. 1. The sliding terminal of the variable voltage 17 is connected to one fixed terminal of another variable resistor 21 which has the other fixed terminal connected to the dc voltage source terminal 14 through a diode 22 and a resistor 23 and a sliding contact connected to the line *a*. The interconnection of the diode 22 and the resistor 23 is also connected to the A side change-over contact of a change-over switch 24 through a resistor 25. The change-over switch 24 has a common contact grounded and the B side change-over contact floated and is interlocked with other change-over switches 13 and 18.

Figure 5:
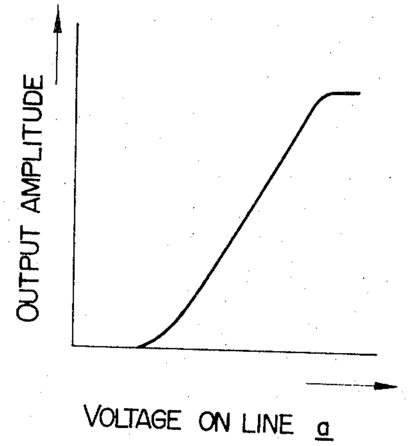
FIGS. 5 and 6 show curves of the output amplitude of the chrominance signal with respect to the gain controlling voltage and the rotation angle of the variable resistor in the embodiment of FIG. 4.

Operation of the circuit will be described hereinbelow. When the change-over switches 13, 18 and 24 are thrown into A side, the voltage applied to the source terminal 14 is divided through the resistors 15 and 19 and the variable resistor 17 and then through the variable resistor 21 and the resistor 25 to apply the voltage on the sliding terminal of the variable resistor 21 to the color control terminal of the band pass amplifier 1 through the line *a* to control the gain of the band pass amplifier 1. The resistances 23 and 25 generate a divided voltage at the interconnection and are selected to such values that the diode 22 becomes non-conductive when the voltage supplied from the variable resistor 17 becomes minimum. The relation of the output amplitude of the band pass amplifier 1 with the dc control voltage supplied to the band pass amplifier 1 through the line *a* becomes non-linear when the dc control voltage becomes small. The use of the diode 22 is to compensate the above non-linearity utilizing the non-linear characteristic of the diode. The change of the output amplitude of the band pass amplifier 1 with respect to the voltage applied to the line *a* is shown in FIG. 5. Line E in FIG. 6 shows the variation of the output amplitude of the band pass amplifier 1 with respect to the variable resistor 17 (in the manual mode when the change-over switches are on A side).

When the change-over switches 13, 18 and 24 are thrown into B side, the output voltage of the transistor 10 is divided by the resistance 16, the variable resistor 17 and the resistance 20 to generate a divided dc voltage on the sliding terminal of the variable resistor 17. Then, the dc voltage on the sliding terminal of the variable resistor 17 is divided through the variable resistance 21 and the input impedance of the band pass amplifier 1 seen from the line *a* and generates a dc voltage on the sliding terminal of the variable resistor 21 to thereby control the band pass amplifier 1. Here, a reverse bias is applied to the diode 22 (since one terminal of the resistor 25 is floated) to make it non-conductive. Thus, the loss in the loop gain for the whole system including the transistors 4 and 10 is reduced and the variable range for the color saturation factor is reduced.

Figure 6:
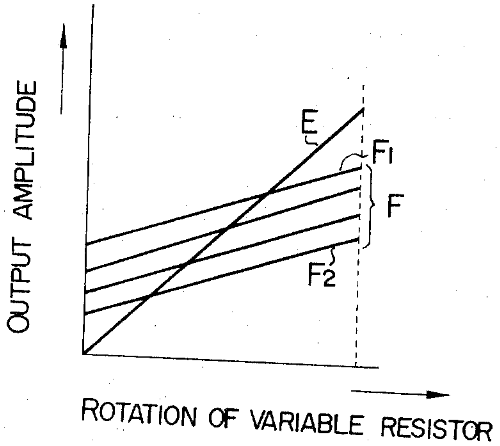

This is shown by line group F in FIG. 6. Line $F_1$ represents the characteristic when the sliding terminal of the variable resistor 21 is set near the end on the side of the variable resistor 17 and line $F_2$ the characteristic when the sliding terminal approaches the end on the side of the diode 22. Here, an appropriate selection of the resistance 20 can lead to a reduction in said loss, an increase in the loop gain of the whole system, and hence a reduction in the variable range of the color saturation by the variable resistance 17.

Further, according to the above embodiment, both of the variable resistors 17 and 21 can be used for adjusting the color saturation. In general, the variable resistance 21 is interlocked with the nob for the brightness or the contrast control. Therefore, the color saturation is approximately selected by said interlocking control, and can be further controlled by manipulating the variable resistance 17 according to personal taste.

What is claimed is:

1. A color television receiver comprising:
a band pass amplifier for the chrominance signal, the gain of which is controlled by a dc control signal applied to a control terminal;
a circuit for mean-rectifying the chrominance signal supplied from said band pass amplifier;
a change-over switch for selecting one of either the output of said rectifying circuit or a dc signal derived from a dc source;
a variable voltage-dividing circuit for dividing the voltage signal selected by said change-over switch, including a variable resistor; and
a circuit for applying the voltage signal divided in said variable voltage-dividing circuit to the control terminal of said band pass amplifier.

2. A color television receiver according to claim 1, further comprising another change-over switch interlocked with said change-over switch for connecting one of two different resistances to said variable voltagedividing circuit in series.

3. A color television receiver comprising:
a band pass amplifier for the chrominance signal, the gain of which is controlled by a dc control signal applied to a control terminal;
a circuit for mean-rectifying the chrominance signal supplied from said band pass amplifier;
a change-over switch for selecting one of either the output of said rectifying circuit or a dc signal derived from a dc source;
a first variable resistance for dividing the voltage selected by said change-over switch, said first variable resistance controlling the color saturation; and
a second variable resistance having one fixed terminal connected to a terminal supplied with the divided voltage from said first variable resistance, another fixed terminal connected to the dc source and selectively to ground through a diode for compensating the non-linearity of the gain control characteristic of said band pass amplifier, and a sliding terminal connected to said control terminal of said band pass amplifier for supplying a dc control signal to control the gain of the band pass amplifier, the second variable resistance interlocking with a variable resistance which controls one of the brightness and the contrast or both the brightness and the contrast.

4. A color television receiver according to claim 3, further comprising another change-over switch interlocked with said change-over switch for selectively connecting one of two different resistances to said first variable resistance in series.

* * * * *